(12) United States Patent
Lee

(10) Patent No.: US 6,276,302 B1
(45) Date of Patent: Aug. 21, 2001

(54) AQUARIUM

(76) Inventor: Steve Lee, 12654 Cuesta St., Cerritos, CA (US) 90703

(\*) Notice: Subject to any disclaimer, the term of this patent is extended or adjusted under 35 U.S.C. 154(b) by 0 days.

(21) Appl. No.: 09/435,474

(22) Filed: Nov. 8, 1999

(51) Int. Cl.[7] .......................... A01K 63/00; A01K 63/04
(52) U.S. Cl. ............................................. 119/260; 119/248
(58) Field of Search .................................. 119/259, 260, 119/261, 245, 248; D30/105; 210/617

(56) References Cited

U.S. PATENT DOCUMENTS

| | | | |
|---|---|---|---|
| 5,026,477 | * | 6/1991 | Yen ........................................ 119/245 |
| 5,108,594 | * | 4/1992 | Giovanetti et al. ................... 119/260 |
| 5,294,335 | * | 3/1994 | Chiang ................................... 119/259 |
| 5,306,421 | * | 4/1994 | Weinstein .............................. 119/248 |
| 5,560,318 | * | 10/1996 | Yoshida et al. ........................ 119/248 |
| 5,705,057 | * | 1/1998 | Hoffa ...................................... 119/260 |
| 5,746,921 | * | 5/1998 | Gargas et al. ......................... 210/617 |

\* cited by examiner

Primary Examiner—Charles T. Jordan
Assistant Examiner—Elizabeth Shaw
(74) Attorney, Agent, or Firm—John K. Park; Park & Sutton LLP

(57) ABSTRACT

An aquarium comprises a container, a dividing plate and a filtration system. The container includes a main cavity for containing water and live underwater creatures, and a bottom cavity below the main cavity. The dividing plate separates the main cavity from the bottom cavity and provides a barrier against fluid communication between the main cavity and the bottom cavity along all but a small fraction of the length and depth of the container. The filtration system communicates by fluid with the bottom cavity for intake of polluted water and with the main cavity for outgo of purified water after the polluted water has been purified by the filtration system.

18 Claims, 3 Drawing Sheets

AQUARIUM

BACKGROUND OF THE INVENTION

This present invention relates to an aquarium. More specifically, this present invention relates to an improved aquarium which requires a less amount of water while minimizing water poisoning.

Aquariums are quite popular to raise aquatic animals and plants as pets, as well as for aesthetic purposes. Aquariums are also used for business, scientific and educational purposes. However, such an aquarium generally occupies large spaces since there should be provided a filter device therein as well as about between 10 and 20 gallons of water. Some larger aquarium requires substantially more water.

It is also commonly understood that frequent water change is expected due to secretes of aquatic animals and food waste which are known to pollute the water in the aquarium. To meet the need there have been introduced various filter devices to minimize the frequency of water change.

Further, it has heretofore been necessary to maintain a large volume of water in both fresh water and salt water aquariums so as to avoid poisoning of the aquatic animals. For example, each gold fish typically requires 10 gallons of water to avoid poisoning, even when the aquarium water is purified by typical filtration system driven by an electric motor.

The aquarium according to the present invention will support aquatic animals and plants in a lesser volume of water than has been heretofore possible. One application of the present invention is an aquarium with several aquatic animals that can be readily mounted on a wall like a painting of photograph because the water inside the aquarium can have as narrow a span from the wall as one inch or less.

Therefore, it is an object of the present invention to provide an aquarium which substantially decreases water poisoning caused by secretes of aquatic animals and wastes of their food.

Another object of the present invention is to provide an aquarium which requires a least amount of water volume and accordingly occupies least space for aquarium installation.

SUMMARY OF THE INVENTION

To achieve the aforementioned objects and other objects, an aquarium according to the present invention comprises a container forming a main cavity and a bottom cavity inside the container, the bottom cavity being below the main cavity, a dividing plate separating the main cavity and the bottom cavity and a filtration system for purifying water in the aquarium. The dividing plate provides a barrier to fluid communication between the main cavity and the bottom cavity along all but a small fraction of the length or depth, or both, of the container. The dividing plate further provides limited fluid communication between the same portions of the aquarium along a substantial part of the length of the container.

Meanwhile, the volume of the bottom cavity is substantially less than the volume of the main cavity. The depth of the container can be about one inch or less.

The limited fluid communication between the main and the bottom cavities can be provided by a narrow gap between the dividing plate and a wall of the container, or by a plurality of holes in the dividing plate.

Further, the filtration system can be located adjacent to one side of the container. The filtration system can have a vacuum pump and as many as four or more filters. One of the filters can have a mechanical filter for removing microorganisms and organic matters; another, activated charcoal for removing harmful chemicals and organic matters from the water; another, an ammonia removing substance for removing ammonia from the water; and another, biological filter balls for mixing air into the water and cultivating nitrifying bacteria in the water.

The filtration system can also have first, second and third conduits. The first conduit can conduct polluted water down through the filters to purify it. The third conduit can conduct the purified water from a bottom part of the filtration system up to the main cavity of the aquarium.

The benefits according to the present invention are numerous. They are: (1) aquariums with much lower water volume than has been heretofore practical can be constructed and used without poisoning; (2) aquariums of standard size and configuration can successfully carry substantially larger quantities of aquatic animals than has been previously practical; (3) the effective filtration system enables a minimal size of decorative aquarium, for example, which can be mounted on a wall; and (4) ammonia as a sedimentary pollutant from the aquatic animals can be more efficiently removed since water circulation and filtration starts from the bottom of the aquarium.

Although the present invention is briefly summarized, the fuller understanding of the invention can be obtained by the following drawings, the detailed description and appended claims.

BRIEF DESCRIPTION OF THE DRAWINGS

The present invention will be better understood with reference to the accompanying drawings, wherein.

DETAILED DESCRIPTION OF THE PREFERRED EMBODIMENTS

With reference to the accompanying drawings, an aquarium according to the present invention will now be described.

Figure 1:
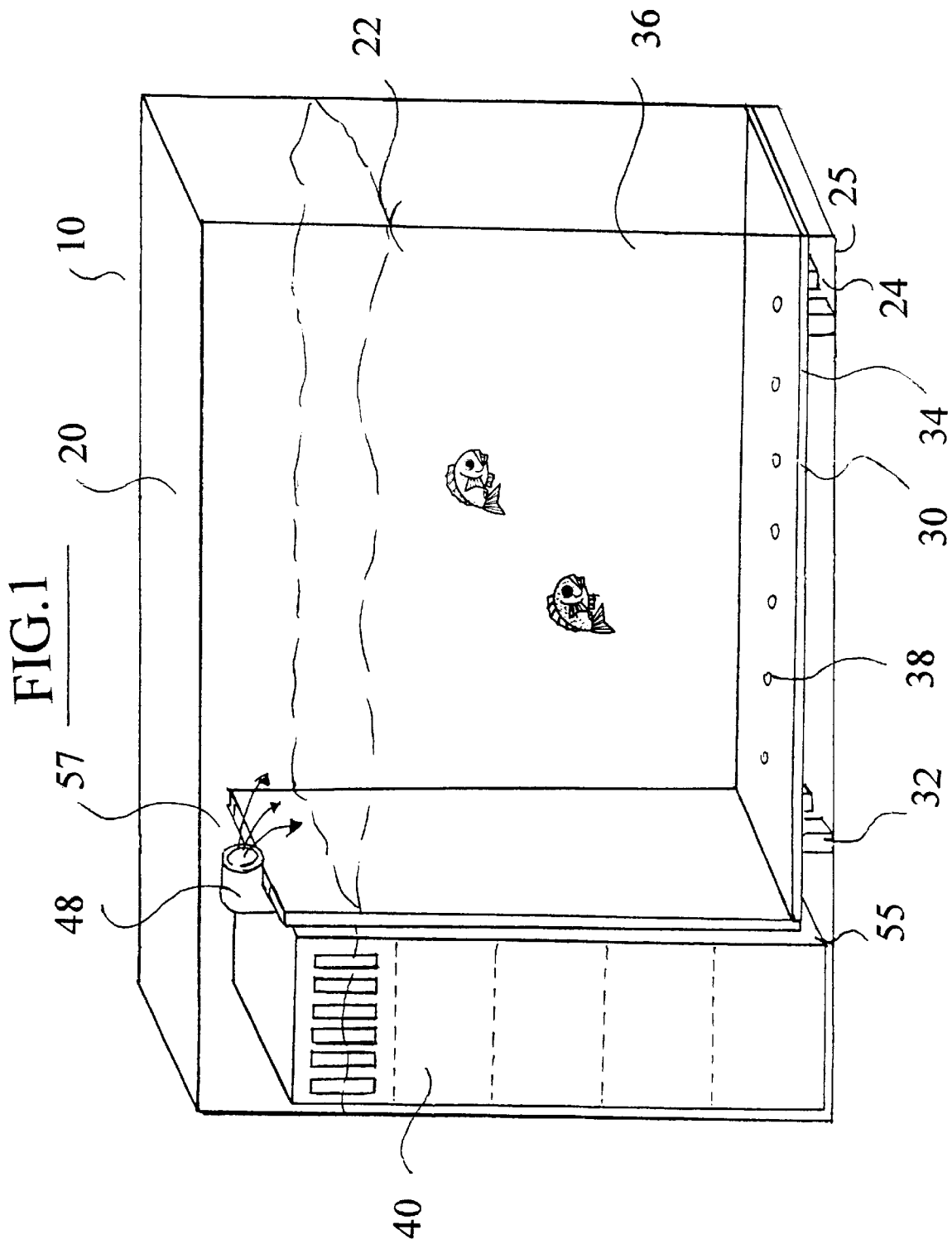
FIG. 1 is a schematic cross-sectional view illustrating an aquarium according to the present invention.
Figure 2:
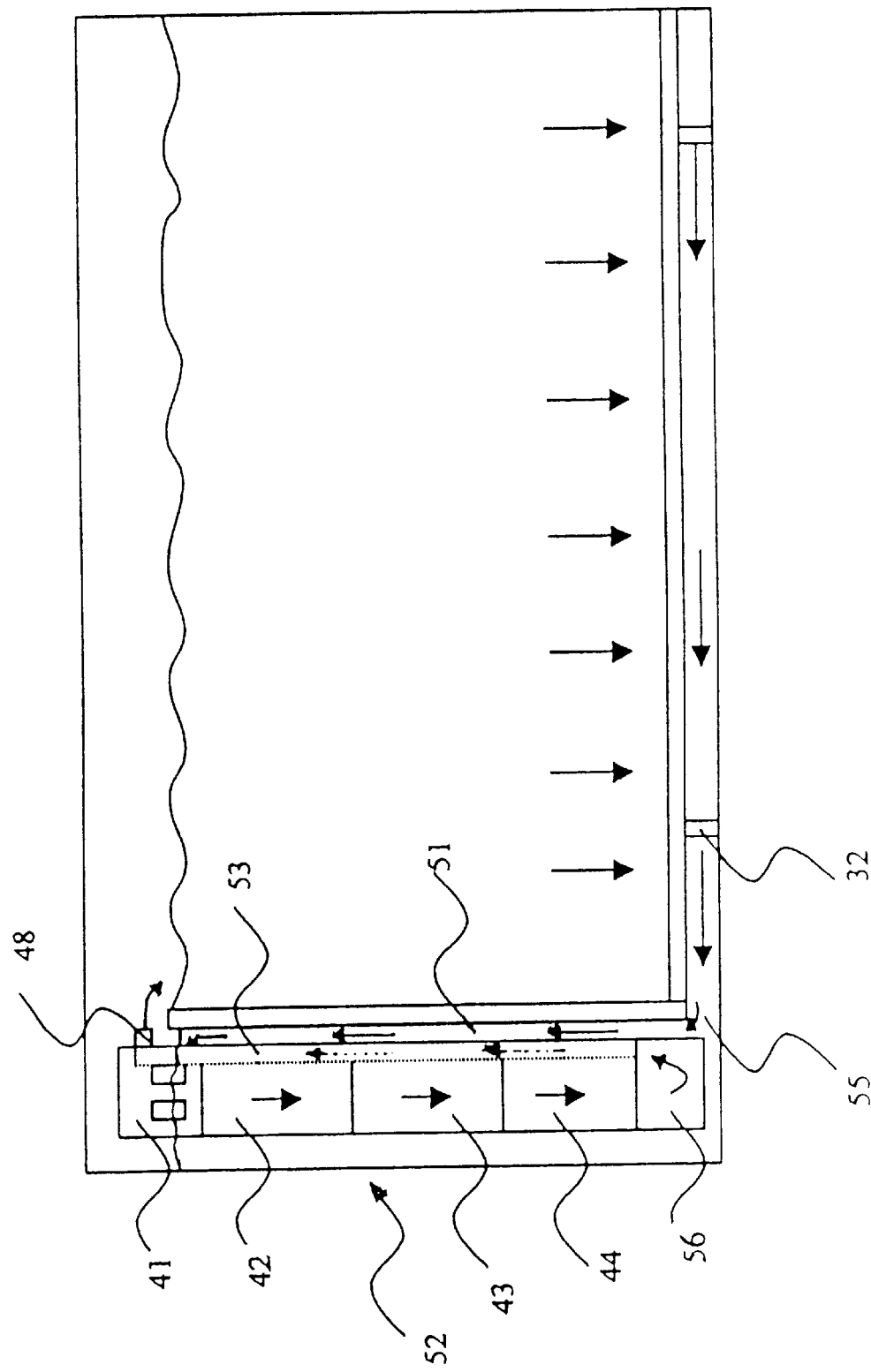
FIG. 2 is a front view illustrating a water flow within the aquarium according to the present invention.

As shown in FIGS. 1 and 2, the aquarium 10 comprises a container 20, a dividing plate 30 and a filtration system 40. The dividing plate 30 and the filtration system 40 are disposed within the container 20.

The container 20 has a height, a length and a depth and forms a main cavity 22 and a bottom cavity 24. The main cavity 22 in the container 20 may contain water and live underwater creatures such as gold fish. The main cavity 22 serves as a first volume. Meanwhile, the bottom cavity 24 serving as a second volume is formed below the main cavity 22 in the container 20. The first volume for the main cavity 22 is substantially larger than the second volume for the bottom cavity 24. Here, it is preferred that the bottom cavity 24 extends along substantially the entire length and depth of the container 20. In a preferred version, the bottom cavity 24 may extend along less than about five percent of the height of the container 20. Also, the depth of the container 20 may be about one inch in measurement.

The dividing plate 30 is horizontally disposed within the container 20 and separates the main cavity 22 from the bottom cavity 24 while providing a barrier against fluid communication between the main cavity 22 and the bottom cavity 24. A good performance can be achieved when the dividing plate 30 is almost 0.25 inch above the bottom 25 of the aquarium 10.

Specifically, the fluid communication between the main cavity 22 and the bottom cavity 24 is implemented along all but a small fraction of the length and depth of the container 20 so that the dividing plate 30 may provide limited fluid communication between the main cavity 22 and the bottom cavity 24 in locations extending along at least a substantial part of the length of the container 20. The dividing plate 30 is supported by supports 32 which are fittingly provided between the dividing plate 30 and a bottom 25 of the container 20.

A narrow gap 34 may be formed between the dividing plate 30 and a wall 36 of the container 20 for providing the fluid communication between the main cavity 22 and the bottom cavity 24.

Alternately, a plurality of holes 38 may be formed through the dividing plate 30 so as to facilitate fluid communication between the main cavity 22 and the bottom cavity 24. More importantly, deadly ammonia that is known as a number one killer of tropical fish may naturally flow down through either the narrow gap 34 or the holes 38 onto the bottom 25, thereby securing safer environment for aquatic creatures within the main cavity 22. Here, it is understood that ammonia released from secretes of fish or food waste is heavier than water. Also, as an improvement, the upper surface of the plate 30 can be used as the bottom of the conventional aquarium supporting rocks, houses and plants for the fish.

The filtration system 40 becomes in fluid communication with the bottom cavity 24 for intake of polluted water. That is, secretes released from water creatures in the main cavity 22 or their food left over are sunk down into the bottom cavity 24 that communicates with the filtration system 40. The filtration system 40 also communicates with the main cavity 22 for outgo of purified water after the water polluted in the main cavity 22 is moved into and purified by the filtration system 40.

Figure 3:
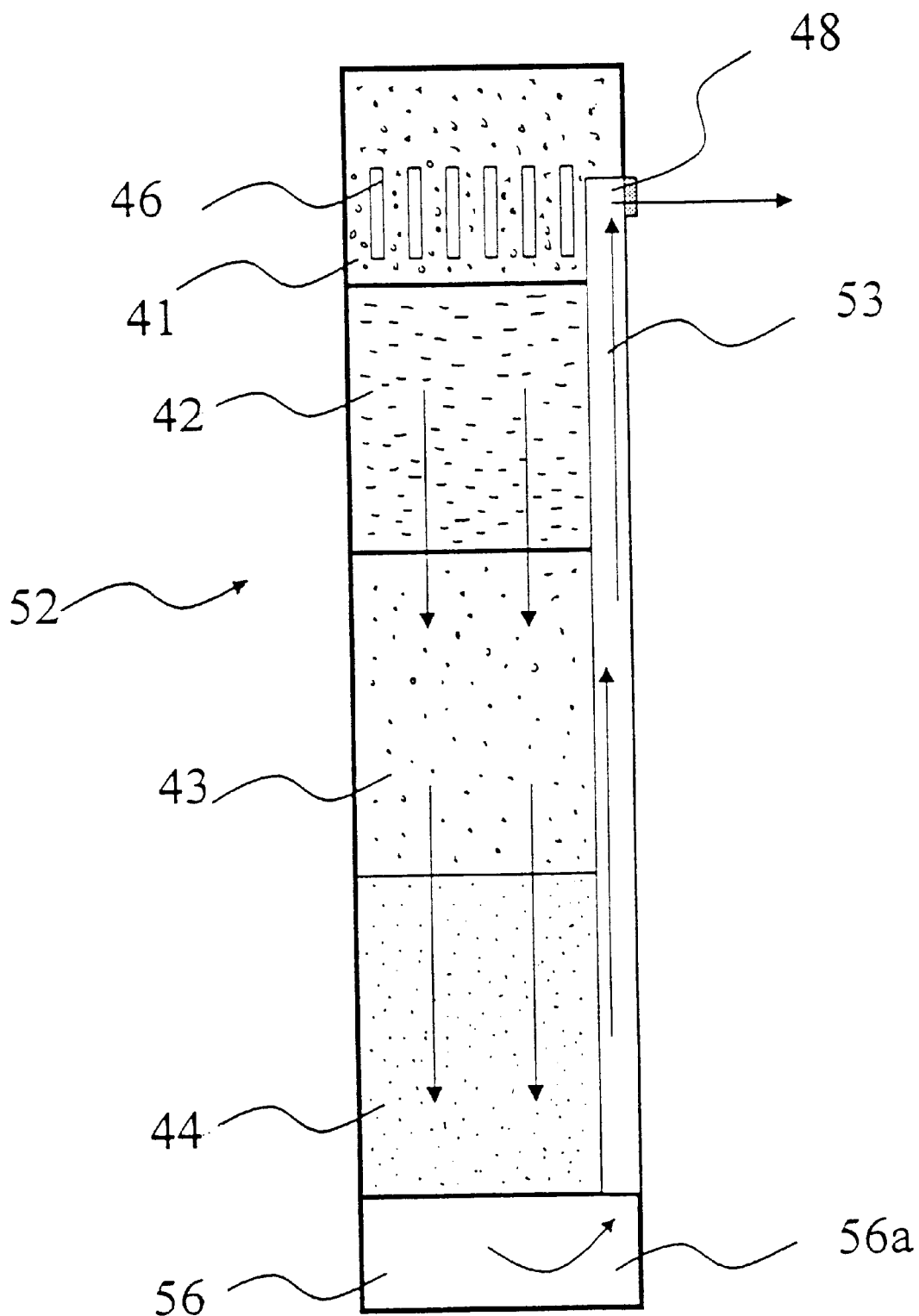
FIG. 3 is an enlargement view detailing a filtration system in the aquarium according to the present invention.

As further shown in FIG. 3, the filtration system 40 may be located adjacent to one side of the aquarium 10 along most of the height of the container 20. The filtration system 40 comprises first to fourth filters 41, 42, 43, 44, an intake opening 46, an outgo opening 48, first to third conduits 51, 52, 53, and a vacuum pump 56.

To circulate and purify the water within the aquarium 10, as freshwater in the main cavity 22 becomes polluted by secretes of aquatic animals and their food waste, the polluted water containing pollutants such as ammonia flows down through either the narrow gaps 34 between the dividing plate 30 and the wall 36 or the holes 38 of the dividing plate 30 into the bottom cavity 24. The vacuum pump 56 driven by an electric motor (not shown) pumps up the polluted water from a water outlet 55 of the bottom cavity 24. The pumped-up water flows up through the first conduit 51 disposed vertically along the filtration system 40 and into the first filter 41 on top of the system 40.

Then, the polluted water is sequentially released down through the second, third and fourth filters 42, 43, 44 for purification, wherein the first to fourth filters 41–44 serve as the second conduit 52. The thusly purified water is raised up through the third conduit 53 adjacent to the second conduit 52 and released back into the main cavity 22 through the outgo opening 48 disposed adjacent to the first filter 41.

In further detail, the first filter 41 receives with air the polluted water pumped up by the vacuum pump 56 through the water outlet 55 and the first conduit 51 from the bottom cavity 24 so as to mechanically remove harmful microorganisms and organic matters from the polluted water as an initial filtration step. The first-filtered water is subsequently dropped into the second filter 42 which is in fluid communication with the first filter 41, wherein the second filter 42 has pelletized activated carbon for substantially removing harmful organic matters, chemicals and some metals from the polluted water.

The third filter 43 is disposed below the second filter 42 and becomes in fluid communication with the second filter 42, wherein the third filter 43 may include ammonia-removing substance such as Ammo-Chips of Aquarium Pharmaceuticals, Inc., for thereby eliminating harmful ammonia from the second-filtered water. The fourth filter 44 is disposed below the third filter 43 and also becomes in fluid communication with the third filter 43, wherein the fourth filter 44 may include a product of biological filter balls such as Bio-Mate of Rainbow Lifegard for thereby mixing air with the water and cultivating nitrifying bacteria in the water.

The first conduit 51 becomes in fluid communication with the water outlet 55 for conducting therethrough the polluted water from the bottom cavity 24 to a top part of the filtration system 40, that is, to the first filter 41. The first to fourth filters 41–44 serve as the second conduit 52. The second conduit 52 becomes in fluid communication with the first conduit 51 and receives the polluted water through the intake opening 46 and the first conduit 51 from the bottom cavity 24. The polluted water passes down through the second conduit 52, that is, through the first, second, third and fourth filters 41, 42, 43, 44 for respective filtration steps. Finally, the vacuum pump 65 driven by an electric motor (not shown) pumps up the filtered water up through the third conduit 53 and the outgo opening 48 back into the main cavity 22 of the container 20.

Specifically, the third conduit 53 extends from a bottom part 56a to a top part 57 of the filtration system 40. The outgo opening 48 becomes in fluid communication with the third conduit 53 and the main cavity 22. The vacuum pump 56 also becomes in fluid communication with the second conduit 52 and third conduit 53 for thereby pumping the polluted water from the bottom cavity, through the water outlet 55, through the first conduit 51, through the second conduit 52 or the respective filters 41–44, through the third conduit 53, through the outgo opening 48, and into the main cavity 22 as the purified water.

The advantages of the aquarium according to the present invention are numerous. First, aquariums with much lower water volume than has been heretofore practical can be constructed and used without poisoning. Second, aquariums of standard size and configuration can successfully carry substantially larger quantities of aquatic animals than has been previously practical. Third, the effective filtration system enables a minimal size of decorative aquarium, for example, which can be mounted on a wall. Fourth, ammonia as a sedimentary pollutant from the aquatic animals can be more efficiently removed since water circulation and filtration starts from the bottom of the aquarium.

Although the present invention has been described in considerable detail with reference to certain preferred versions thereof, other versions are possible by converting the aforementioned construction. Therefore, the scope of the invention shall not be limited by the specification specified above and the appended claims.

What is claimed is:

1. An aquarium comprising:
   a) a container having a height, a length and a depth, the container forming;
      (i) a main cavity inside the container for containing water and live underwater creatures, the main cavity having a first volume;
      (ii) a bottom cavity inside the container below the main cavity, the bottom cavity containing water and having a second volume substantially less than the first volume;
   b) a dividing plate separating the main cavity from the bottom cavity, the dividing plate providing a barrier against fluid communication between the main cavity and the bottom cavity along all but a small fraction of the length and depth of the container, the dividing plate providing limited fluid communication between the main cavity and the bottom cavity in locations extending along at least a substantial part of the length of the container, and the dividing plate providing a narrow gap between the dividing plate and a wall of the container for the fluid communication between the main cavity and the bottom cavity; and
   c) a filtration system being in fluid communication with the bottom cavity for intake of polluted water, the filtration system also being in fluid communication with the main cavity for outgo of purified water after the polluted water has been purified by the filtration system.

2. The aquarium of claim 1, wherein the bottom cavity extends along substantially the entire length and depth of the container.

3. The aquarium of claim 2, wherein the dividing plate includes a plurality of holes for providing the fluid communication between the main cavity and the bottom cavity.

4. The aquarium of claim 3, wherein the bottom cavity extends along less than about twenty (20) percent of the height of the container.

5. The aquarium of claim 4, wherein the depth of the container is about one inch.

6. The aquarium of claim 1, wherein the depth of the container is about one inch.

7. An aquarium comprising:
   a) a container having a height, a length and a depth, the container forming;
      (i) a main cavity inside the container for containing water and live underwater creatures, the main cavity having a first volume;
      (ii) a bottom cavity inside the container below the main cavity, the bottom cavity containing water and having a second volume substantially less than the first volume;
   b) a dividing plate separating the main cavity from the bottom cavity, the dividing plate providing a barrier against fluid communication between the main cavity and the bottom cavity along all but a small fraction of the length and depth of the container, the dividing plate providing limited fluid communication between the main cavity and the bottom cavity in locations extending along at least a substantial part of the length of the container; and
   c) a filtration system being in fluid communication with the bottom cavity for intake of polluted water, the filtration system also being in fluid communication with the main cavity for outgo of purified water after the polluted water has been purified by the filtration system, and wherein the filtration system comprises:
      i) a first filter comprising biological filter balls for mixing air with the water and cultivating nitrifying bacteria in the water;
      ii) a second filter being in fluid communication with the first filter for mechanically removing harmful microorganisms and organic matters from the polluted water;
      iii) a third filter being in fluid communication with the second filter, the third filter having an ammonia-removing substance for removing ammonia from the polluted water;
      iv) a fourth filter being in fluid communication with the third filter, the fourth filter having activated carbon for removing harmful organic matters and chemicals from the polluted water;
      v) an intake opening adjacent to and in fluid communication with the bottom cavity;
      vi) a first conduit in fluid communication with the intake opening for conducting the polluted water to a top part of the filtration system;
      vii) a second conduit in fluid communication with the first conduit and the first, second, third and fourth filters for passing the polluted water down through the filters;
      viii) a third conduit extending from a bottom part of the filtration system to the top part;
      ix) an outgo opening in fluid communication with the third conduit and the main cavity of the aquarium; and
      x) a vacuum pump in fluid communication with the second conduit and third conduit for pumping the polluted water from the bottom cavity, through the intake opening, through the first and second conduits, through each of the filters, through the third conduit, through the outgo opening, and into the main cavity as the purified water.

8. The aquarium of claim 7, wherein the bottom cavity extends along substantially the entire length and depth of the container.

9. The aquarium of claim 8, wherein the dividing plate includes a plurality of holes for providing the fluid communication between the main cavity and the bottom cavity.

10. The aquarium of claim 9, wherein the bottom cavity extends along less than about twenty (20) percent of the height of the container.

11. The aquarium of claim 10, wherein the depth of the container is about one inch.

12. The aquarium of claim 9, wherein the depth of the container is about one inch.

13. An aquarium comprising:
   a) a container having a height, a length and a depth, the container forming;
      (i) a main cavity inside the container for containing water and live underwater creatures, the main cavity having a first volume;
      (ii) a bottom cavity inside the container below the main cavity, the bottom cavity containing water and having a second volume substantially less than the first volume;
   b) a dividing plate separating the main cavity from the bottom cavity, the dividing plate providing a barrier against fluid communication between the main cavity and the bottom cavity along all but a small fraction of the length and depth of the container, the dividing plate providing limited fluid communication between the main cavity and the bottom cavity in locations extending along at least a substantial part of the length of the container, and the dividing plate providing a narrow gap between the dividing plate and a wall of the container for the fluid communication between the main cavity and the bottom cavity; and c) a filtration system being in fluid communication with the bottom cavity for intake of polluted water, the filtration system also being in fluid communication with the main cavity for outgo of purified water after the polluted water has been purified by the filtration system, wherein the filtration system comprises:
  (i) a first filter comprising biological filter balls for mixing air with the water and cultivating nitrifying bacteria in the water;
  (ii) a second filter in fluid communication with the first filter for mechanically removing harmful microorganisms and organic matters from the polluted water;
  (iii) a third filter in fluid communication with the second filter, the third filter having an ammonia-removing substance for removing ammonia from the polluted water; and
  (iv) a fourth filter in fluid communication with the third filter, the fourth filter having activated carbon for removing harmful organic mater and chemicals from the polluted water; and
  (v) a vacuum pump in fluid communication with the bottom cavity for pumping the polluted water from the bottom cavity, through the first, second, third and fourth filters and into the main cavity as the purified water.

14. The aquarium of claim 13, wherein the bottom cavity extends along substantially the entire length and depth of the container.

15. The aquarium of claim 14, wherein the dividing plate includes a plurality of holes for providing the fluid communication between the main cavity and the bottom cavity.

16. The aquarium of claim 15, wherein the bottom cavity extends along less than about twenty (20) percent of the height of the container.

17. The aquarium of claim 16, wherein the depth of the container is about one inch.

18. The aquarium of claim 13, wherein the depth of the container is about one inch.

* * * * *